United States Patent [19]

Tsuchiya

[11] Patent Number: 4,700,372

[45] Date of Patent: Oct. 13, 1987

[54] X-RAY GENERATING APPARATUS

[75] Inventor: Akira Tsuchiya, Ootawara, Japan

[73] Assignee: Kabushiki Kaisha Toshiba, Kawasaki, Japan

[21] Appl. No.: 786,610

[22] Filed: Oct. 11, 1985

[30] Foreign Application Priority Data

Oct. 18, 1984 [JP] Japan .............................. 59-219057

[51] Int. Cl.[4] ........................ H02M 7/48; H05G 1/12; H05G 1/20

[52] U.S. Cl. .................................... 378/105; 363/138; 378/101

[58] Field of Search ........................ 378/101, 105, 102; 363/138

[56] References Cited

U.S. PATENT DOCUMENTS

| | | | |
|---|---|---|---|
| 4,191,993 | 3/1980 | Kratz et al. | 363/138 |
| 4,213,049 | 7/1980 | Seifert | 378/105 |
| 4,225,788 | 9/1980 | Franke | 378/105 |
| 4,295,049 | 10/1981 | Ebersberger | 378/110 |
| 4,446,513 | 5/1984 | Clénet | 363/138 |

FOREIGN PATENT DOCUMENTS

| | | | |
|---|---|---|---|
| 2913622 | 10/1979 | Fed. Rep. of Germany . | |
| 3523622 | 1/1986 | Fed. Rep. of Germany . | |
| 693521 | 10/1979 | U.S.S.R. | 363/138 |

*Primary Examiner*—Carolyn E. Fields
*Assistant Examiner*—T. N. Grigsby
*Attorney, Agent, or Firm*—Finnegan, Henderson, Farabow, Garrett & Dunner

[57] ABSTRACT

An X-ray generating apparatus is adapted to obtain an X-ray tube voltage by rectifying an incoming AC voltage to obtain a DC voltage, supplying the DC voltage, after being switched through a switching section, in a predetermined cycle to a resonance circuit comprised of a primary winding of a transformer and resonance capacitors and rectifying the AC voltage which is induced in the secondary winding of the transformer. The switching section comprises a three-phase bridge inverter circuit including parallel arrays of arms each of which is made up of a pair of switching elements. The switching section is so controlled that the switching elements in each respective arm are fired without being continuously turned ON. Each resonance capacitor is connected between an intermediate connection point of the respective arm of the switching section and the primary winding of the transformer.

6 Claims, 4 Drawing Figures

X-RAY GENERATING APPARATUS

BACKGROUND OF THE INVENTION

This invention relates to an X-ray generating apparatus equipped with a power source circuit comprised of a bridge type inverter circuit having a resonance circuit.

It is known that an X-ray generating apparatus includes a power source circuit comprised of a bridge type inverter circuit having a resonance circuit in its switching section. One form of the X-ray generating apparatus is disclosed in U.S. Pat. No. 4,225,788.

This type of X-ray generating apparatus is adapted to obtain a DC voltage by rectifying and smoothing an AC input signal supplied from a power source (in general, a commercial power source). The DC voltage is intermittently supplied to a resonance circuit, including a primary winding of a transformer and resonance capacitor, by an alternate switching operation of a pair of series-connected switching elements, such as thyristors. As a result, an AC output is induced in the secondary winding of the transformer and, after being rectified, supplied to the X-ray tube. A rectifying element (diode) is normally connected in parallel with the switching element in a cathode-to-anode (i.e., an inverse parallel) fashion.

In the X-ray generating apparatus, if two series-connected switching elements overlappingly conduct for some reason or other, an excess short-circuit current flows through the switching elements, thus leading to a failure of the switching elements.

In order to solve this problem, the first and second switching elements are so controlled that after the first switching element is completely turned OFF, the second switching element is turned ON.

Even in this method, the problem may still arise, for example, due to a variation in the characteristic of the circuit elements and due to an instability of a gate pulse which is supplied from the control means for the switching elements.

In order to protect the switching element from an excess current, use may be made of a fast-break fuse or a circuit breaker. The fast-break fuse capable of an adequately high speed operation is normally costly. Furthermore, the circuit breaker is slow to respond and, therefore, it is not possible to provide adequate protection.

A switching element, such as a thyristor, takes a predetermined time from the ceasing of the ON current due to the turning OFF of the thyristor until it fails to conduct even if a forward voltage has again been applied. This predetermined time is referred to as a turn-off time (reverse recovery time) and is of the order of tens of $\mu$s even for an ordinary high-speed type.

In consequence, the closing timing of the next switching element is restricted and, for this reason, the ripple factor of the X-ray tube voltage waveform is increased, causing a fall in an output dose.

SUMMARY OF THE INVENTION

The object of this invention is to provide an X-ray generating apparatus of a simpler configuration which assures adequate protection against a short-circuit current and lowers the ripple factor in an X-ray tube voltage waveform and thus obtains a high-output X-ray.

In order to attain the above-mentioned object of this invention there is provided an X-ray generating apparatus comprising a rectifier section for rectifying an incoming AC voltage to obtain a DC voltage; a transformer; a resonance capacitor section which, together with a primary winding of the transformer, constitutes a resonance circuit; and a switching section for permitting the DC voltage to be supplied in a predetermined cycle to the resonance circuit, the AC voltage being induced in a secondary winding of the transformer is rectified to obtain an X-ray tube voltage, in which the switching section comprises a bridge inverter circuit of at least three phases including parallel arrays of arms, each of which is comprised of a pair of series-connected switching elements, and the resonance capacitor section includes resonance capacitors, each connected between an intermediate connection point of the respective arm of the switching section and the primary winding of the transformer. The switching section is so controlled that, without the series-connected switching elements in the same phase being continuously turned ON, the switching element in another phase is sequentially fired.

In the X-ray generating apparatus of this invention there is no danger of the series-connected switching elements in the same phase being simultaneously turned ON and it is therefore possible to prevent any possible breakage of circuit elements resulting from any abnormal current, such as a short-circuit current.

Furthermore, the ON/OFF repetition cycle per switching element becomes several times longer than in the case of a single-phase switching section. This permits the use of low-cost, low-speed switching elements, and thus the obtainment of a low-cost X-ray generating apparatus. Since the next switching element to be turned ON is located in another phase, it can be turned ON without awaiting the turn-off time of the "now turned OFF" switching element. It is, therefore, possible to reduce the ripple factor of the X-ray tube voltage waveform, as will as to obtain a high-output X-ray of adequate dosage.

DETAILED DESCRIPTION OF THE PREFERRED EMBODIMENTS

Figure 1:
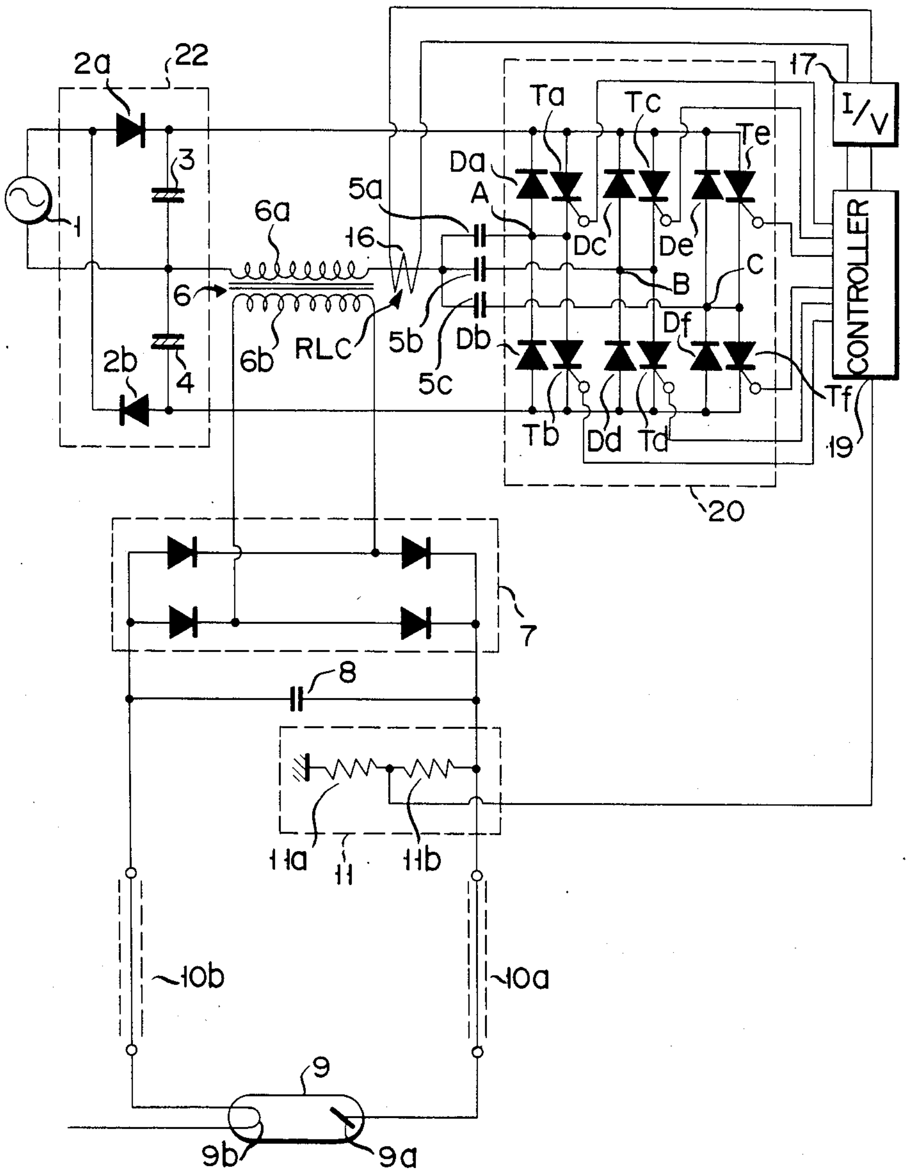
FIG. 1 is a circuit diagram of an X-ray generating apparatus according to one embodiment of this invention.

In FIG. 1, an X-ray generating apparatus according to one embodiment of this invention is comprised of a power source 1, transformer 6, a high-tension rectifier section 7, capacitor 8, X-ray tube 9, high-tension cables 10*a*, 10*b*, voltage detector section 11, current detector 16, current-voltage (I/V) converter 17, controller 19, switching section 20 and rectifying/smoothing circuit 22.

The power source 1 is of an AC type and, normally, a commercial power source is used as such. The rectifying/smoothing section 22 is comprised of rectifiers 2*a*, 2*b* and smoothing capacitors 3, 4 and adapted to double voltage rectify and smooth an AC voltage from the power source to generate a DC voltage.

A resonance circuit RLC is comprised of a primary winding 6*a* and resonance capacitors 5*a*, 5*b* and 5*c*, each, having one terminal commonly connected to the primary winding 6*a*.

A switching section 20 includes thyristors (switching elements) connected in a three-phase bridge configuration with the intermediate connection points A, B and C of the arms of respective phases of the three-phase bridge connected to the primary winding 6*a*.

A secondary winding 6*b* of the transformer 6 is connected to the high-tension rectifier section 7 which is comprised of four rectifying elements 7*a*, 7*b*, 7*c* and 7*d* connected in a bridge configuration.

The DC output of the high-tension rectifier section 7 is smoothed by a smoothing capacitor 8 and then supplied, through the high-tension cables 10*a* and 10*b* to an anode 9*a* and filament 9*b* of the X-ray tube 9. At the same time, a voltage applied to the X-ray tube is detected by the voltage detector section 11 which is comprised of voltage-divided resistors 11*a* and 11*b* connected to the output side of the high-tension rectifier section 7.

The switching section 20 constitutes a so-called three-phase bridge inverter circuit and is configured as mentioned below. That is, the three-phase bridge inverter circuit is comprised of three pairs of series-connected circuits with the thyristor (switching element) and diode (rectifying element) in each pair connected, cathode-to-anode, in a parallel combination, noting that each pair corresponds to one phase arm of the bridge inverter circuit. In FIG. 1, reference symbols Ta through Tf are attached to the thyristors and reference symbols Da through Df are attached to the diodes, each of which is connected in parallel with the corresponding thyristor in a cathode-to-anode fashion.

The controller 19 triggers and fires the respective thyristors Ta through Tf and controls the timing in which the thyristor is fired. The current detector 16, for example, a current transformer (CT), is connected between the capacitors 5*a*, 5*b*, 5*c* and the primary winding 6*a* to permit its detection current to be transformed to a voltage signal through an I/V converter 17. The outputs of the I/V converter 17 and the voltage detector section 11 are fed back to the controller 19. The trigger pulse is supplied in a predetermined timing (cycle) to the corresponding gate of the respective thyristors Ta through Tf. The controller 19 controls the timing, in which the trigger pulse is fed to the gate of the respective thyristors Ta through Tf, in accordance with a feedback signal which is supplied from the I/V converter 17 and voltage detector section 11.

A high voltage of about 75 KV against ground is obtained from the above-mentioned current transformer 6, high-tension rectifier section 7, smoothing capacitor 8, X-ray tube 9 and high-tension cables 10*a* and 10*b* and, within a housing of the X-ray device, these circuit elements are impregnated with an electrically insulative oil.

Figure 2A:
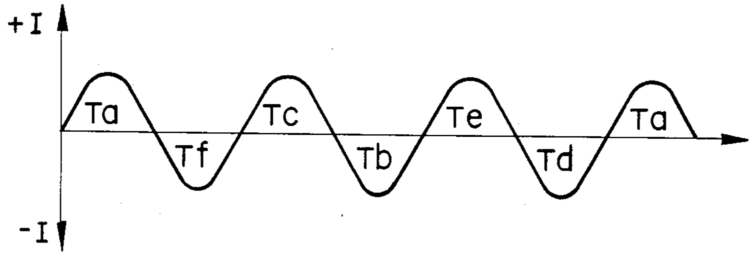
FIG. 2A is a waveform showing a primary current of a transformer T in the X-ray generating apparatus shown in FIG. 1.
Figure 2B:
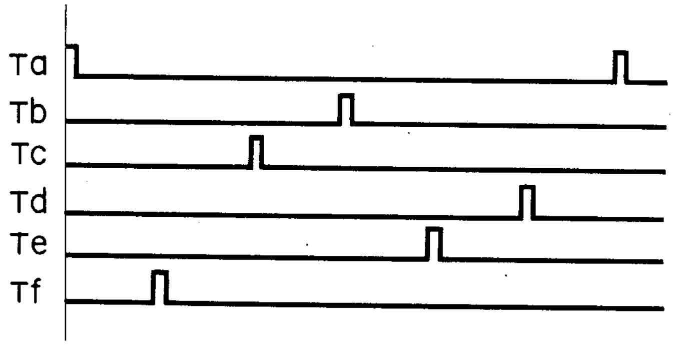
FIG. 2B shows a timing chart of a gate pulse which is applied to each switching element in the X-ray generating apparatus shown in FIG. 1.

The operation of the X-ray generating apparatus so constructed will be explained below with reference to FIGS. 2A and 2B. FIG. 2A is a waveform showing the primary current of the transformer 6 and FIG. 2B is a timing chart of the gate pulse which is supplied from the controller 19 to the switching section 20.

An AC voltage is supplied from the power source 1 to the rectifying/smoothing circuit 22 where it is double voltage rectified by the rectifiers 2*a*, 2*b* and smoothed by the capacitors 3 and 4. The DC output voltage of the rectifying/smoothing circuit 22 is supplied to the switching section 20 (the three-phase bridge inverter circuit). The respective thyristor (Ta through Tf) in the switching section 20 conducts, only during a period corresponding to a 120° electrical angle each time it is fired. The thyristors Ta through Tf are cyclically fired in an order of Ta→Tf→Tc→Tb→Te→Td. In this case, the next gate pulse is entered with a cycle longer than the resonance cycle of the respective resonance circuits comprised of the primary winding 6*a* and capacitor 5*a*, 5*b* or 5*c*. That is, the resonance cycle T is given below:

$$T = 2\pi\sqrt{(1/CL) - (R^2/4L^2)}$$

Here, attention is invited to one phase only. When, for example, the thyristor Ta conducts, a current flows through the thyristor Ta, connection point A, resonance capacitor 5*a* and primary winding 6*a*. The primary winding 6*a* and resonance capacitor 5*a* of the resonance circuit RLC have their constants selected to satisfy the resonance requirements. When one half cycle of the primary current is ended, therefore, the primary current opposite in direction to the previous current, while decaying, flows by electromagnetic energy stored in the primary winding 6*a* and thus the opposite oscillatory current flows through the diode Da connected to the thyristor Ta in the cathode-to-anode fashion. For this reason, the resonance capacitor 5*a* is charged negatively, that is, with a polarity opposite to the previous polarity. A current flowing through the diode Da is decreased, resulting in a decrease in a forward current of the thyristor Ta. When the forward current of the thyristor Ta is decreased below a holding current of the thyristor Ta, then the thyristor Ta is turned OFF.

Then, the thyristor Tf in another phase of the three-phase bridge, not the thyristor Ta, is turned ON. In this case, the thyristor Tf can be turned ON with a phase (i.e., a timing) at which the primary current becomes zero, and without waiting for the turning OFF of the thyristor Ta. When the thyristor Tf is turned ON, a current flows through the thyristor Tf, connection point C, resonance capacitor 5*c* and primary winding 6*a*. When one half of the primary current is ended, the oscillatory current opposite in direction to the previous current, while decaying, flows through the rectifying element by an electromagnetic energy stored in the primary winding 6*a*.

Similarly, the primary current (the oscillatory current) of the transformer 6 flows cyclically with a predetermined phase difference due to the switching of the switching section 20 and resonance of the resonance circuit RLC.

When the primary current flows through the primary winding 6*a*, a high voltage is induced in the secondary winding 6*b* of the transformer 6. The high voltage, after being rectified and smoothed by the high-tension rectifier section 7 and capacitor 8, respectively, is applied across the filament 9*b* and the anode 9*a* in the X-ray tube 9.

During the X-ray exposure of the X-ray tube 9, a large current of several hundreds of amperes is obtained at the primary winding of the transformer 6 as a peak level.

The output voltage of the high-voltage generating circuit can be set to a desired level by varying the firing phase of the respective thyristors Ta through Tf.

In comparison with a normal single-phase switching circuit corresponding to, for example, a switching circuit of thyristors Ta and Tb, the turn-on repetition cycle of the respective thyristors Ta through Tf becomes several times greater. Since the next thyristor is turned ON, after a certain thyristor is located within another phase arm, it can be fired without awaiting the turning-off of the ON thyristor.

Where the controller 19 is operated in accordance with a voltage detected through the current detector 16, I/V converter 17 and voltage detector section 11 and thus the firing phases of the respective thyristors are properly adjusted, then it is possible to enhance the stability of the primary current and output voltage of the transformer 6.

This invention is not restricted to the above-mentioned embodiment and a variety of changes and modifications can be made without departing from the spirit and scope of this invention.

Although, in the above-mentioned embodiment, the switching section 20 has been explained as being comprised of a half bridge circuit, it may be comprised of a full bridge circuit.

Figure 3:
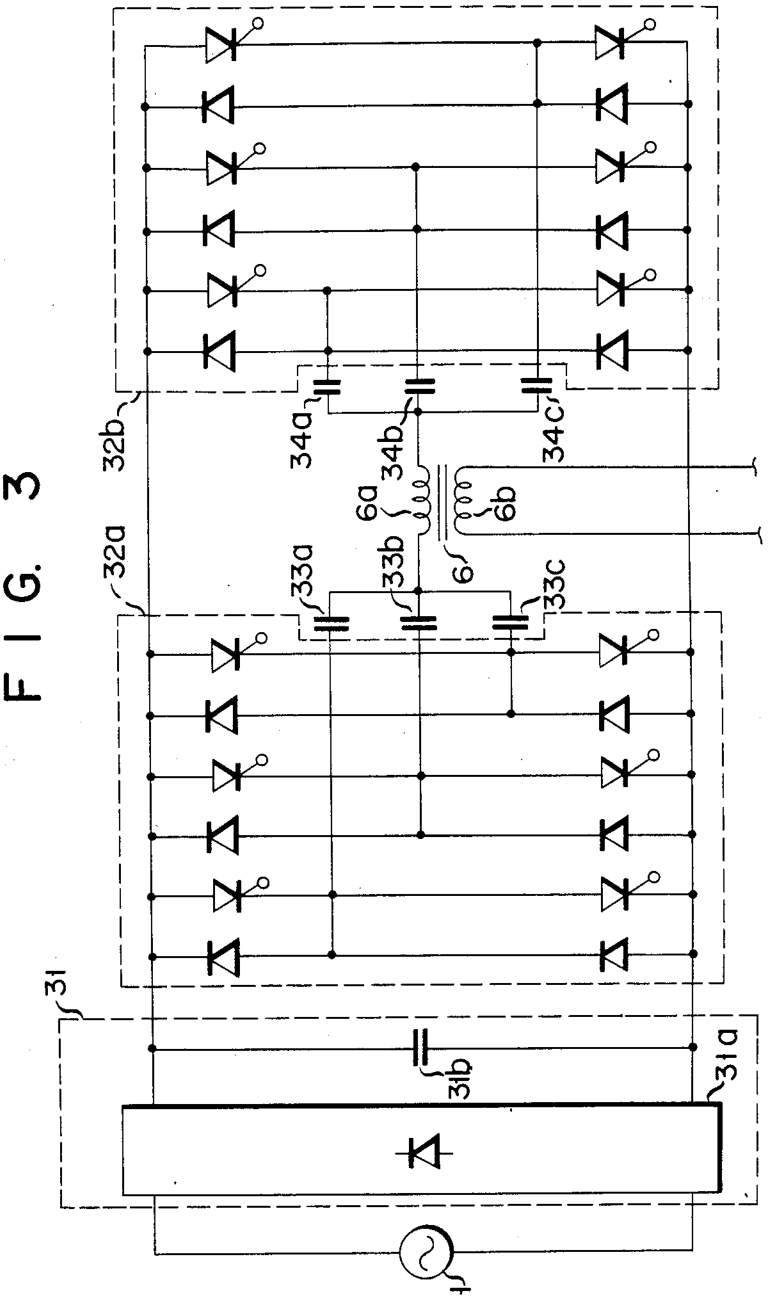
FIG. 3 is a circuit diagram showing a major part of an X-ray generating apparatus of this invention.

FIG. 3 shows a major part of an X-ray generating apparatus according to another embodiment of this invention with the switching section as a full bridge circuit.

FIG. 3 shows circuit elements or parts in the X-ray generating apparatus to the extent necessary to explain a difference from the apparatus of FIG. 1: a power source 1, transformer 6, rectifying/smoothing circuit 31, switching sections 32*a*, 32*b* and resonance capacitors 33*a* to 33*c* and 34*a* to 34*c*.

The rectifying/smoothing circuit 31 is comprised of a rectifying circuit 31*a* connected to the power source 1 and a smoothing capacitor 31*b* connected to the rectifying circuit 31*a*.

The switching sections 32*a* and 32*b* both provide two sets of switching circuits, each of which is of such a bridge-connected type as shown in FIG. 1. The switching sections 32*a* and 32*b* are connected to the output of the rectifying/smoothing circuit 31. That is, the switching sections 32*a* and 32*b* constitute a parallel circuit to which the DC output of the rectifying/smoothing circuit 31 is supplied.

The resonance capacitors 33*a* to 33*c* are connected at one terminal to a common intermediate connection point of the respective phase arms of the switching section 32*a* and at the other terminal to a primary winding 6*a* of the transformer 6.

The resonance capacitors 34*a* to 34*c* are connected at one terminal to a common intermediate connection point of the respective phase arms of the switching section 32*b* and at the other terminal to a primary winding 6*a* of the transformer 6.

In this case, the respective switching elements of the switching sections 32*a*, 32*b* are controlled by a controller, not shown, as follows:

The operation of one of the switching sections 32*a*, 32*b*, for example, the switching section 32*a*, is controlled as in the case of the switching section 20 of FIG. 1. The other switching section 32*b* is so controlled that the firing of the switching elements therein is synchronized with that of the switching elements in the switching section 32*a* and that when the switching element of the switching section 32*a* which is located remote from one of the output terminals of the rectifying/smoothing circuit 31 is rendered conductive the switching element of the switching section 32*b* located near said one output terminal of the rectifying/smoothing element 31 is rendered conductive. The respective switching elements of the switching section 32*b* are fired in the same order as in the case of the switching section 20.

In the arrangement shown in FIG. 3, a current detector is connected between the primary winding 6*a* and the resonance capacitors 33*a* to 33*c* and/or the resonance capacitors 34*a* to 34*c*.

As the switching element use may be made of, in addition to an ordinary thyristor, a gate turn-on thyristor (GTO), giant transistor (GTR) or the like.

The input power source 1 may be of a single-phase or a three-phase type and the smoothing capacitor 8 may be omitted if the system permits ripple components.

What is claimed is:

1. An X-ray generating apparatus comprising:

first rectifying means, having positive and negative output terminals and a return terminal, for rectifying an input AC voltage to generate a first DC voltage between said output terminals;

a transformer having a primary winding and a secondary winding;

second rectifying means, coupled across said secondary winding, for rectifying a first AC voltage induced in said secondary winding to generate a second DC voltage;

an X-ray tube connected to receive said second DC voltage from said second rectifying means;

first, second and third capacitors;

a bridge inverter circuit having first, second and third phase arms with each arm comprising a pair of switching elements connected in series between said positive and negative output terminals of said first rectifying means in a manner to permit selective conduction of current from said terminals to a common node between said elements, said first, second and third capacitors each coupled between a respective one of said common nodes and one end of said primary winding of said transformer to form respective first, second and third resonance circuits each comprising one of said capacitors and said primary winding;

by-pass means, connected in parallel with each said switching element for conducting resonance current from a respective one of said resonance circuits, past said each said switching element in a direction opposite the flow of current through that switching element;

means for coupling said return terminal of said first rectifying means to the other end of said primary winding; and control circuit means, connected to each of said switching elements, for sequentially turning on said switching elements (i) in an order to permit altcrnate half cycle positive and negative current flow through said primary winding with each consecutive half cycle of current flow involving a different one of said arms and (ii) at a repetition rate which prevents ever simultaneously turning on both switching elements in any one arm.

2. An X-ray generating apparatus according to claim 1 in which said by-pass means each comprise a diode connected in an inverse parallel fashion to a corresponding switching element.

3. An X-ray generating apparatus according to claim 1 in which said switching elements each comprise a thyristor.

4. An X-ray generating apparatus according to claim 1 in which said switching elements each comprise a gate turn-off thyristor.

5. An X-ray generating apparatus according to claim 1 in which said switching elements each comprise a transistor.

6. An X-ray generating apparatus comprising:

first rectifying means, having positive and negative output terminals, for rectifying an input AC voltage to generate a first DC voltage between said output terminals;

a transformer having a primary winding and a secondary winding;

second rectifying means, coupled across said secondary winding, for rectifying a first AC voltage induced in said secondary winding to generate a second DC voltage;

an X-ray tube connected to receive said second DC voltage from said second rectifying means;

first, second, third, fourth, fifth and sixth capacitors;

first and second half bridge inverter circuits each having first, second and third phase arms with each arm comprising a pair of switching elements connected in series between said positive and negative output terminals of said first rectifying means in a manner to permit selective conduction of current from said terminals to a common node between said elements, said first, second and third capacitors each coupled between a respective one of said common nodes of said first half bridge inverter circuit and one end of said primary winding of said transformer to form respective first, second and third resonance circuits each comprising one of said first, second and third capacitors and said primary winding, and said fourth, fifth and sixth capacitors each coupled between a respective one of said common nodes of said second half bridge inverter circuit and the other end of said primary winding of said transformer to form respective fourth, fifth and sixth resonance circuits each comprising one of said fourth, fifth and sixth capacitors and said primary winding;

by-pass means, connected in parallel with each said switching element, for conducting resonance current from a respective one of said resonance circuits past each said switching element in a direction opposite the flow of current through that switching element; and control circuit means, connected to each of said switching elements, for sequentially turning on said switching elements (i) in an order to permit alternate half cycle positive and negative current flow through said primary winding with each consecutive half cycle of current flow involving a different one of said arms in said first half bridge inverter circuit and a different one of said arms in said second half bridge inverter circuit and (ii) at a repetition rate which prevents ever simultaneously turning on both switching elements in any one arm of said first half bridge inverter circuit or in any one arm of said second bridge inverter circuit.

* * * * *